United States Patent [19]

Marcon

[11] Patent Number: 5,542,398
[45] Date of Patent: Aug. 6, 1996

[54] LPG FUEL TANK, AND FUEL SUPPLY SYSTEM, FOR ENGINES

[76] Inventor: Robert V. Marcon, 3471 Sinnicks Avenue, Niagara Falls, Ontario, Canada, L2J 2G6

[21] Appl. No.: 429,068

[22] Filed: Apr. 26, 1995

[51] Int. Cl.$^6$ .................................................. F02M 21/02
[52] U.S. Cl. ............................................................ 123/527
[58] Field of Search .................................. 123/525, 527, 123/575

[56] References Cited

U.S. PATENT DOCUMENTS

| | | | |
|---|---|---|---|
| 3,018,914 | 1/1962 | Webster | 220/3 |
| 3,941,554 | 3/1976 | Curtis | 431/89 |
| 4,421,087 | 12/1983 | Schuurman | 123/525 |
| 4,528,966 | 7/1985 | Lent et al. | 123/527 |
| 4,881,520 | 11/1989 | Hefling | 126/44 |
| 4,887,579 | 12/1989 | Fenton et al. | 123/525 |
| 5,150,690 | 9/1992 | Carter et al. | 123/527 |
| 5,353,765 | 10/1994 | Saikalis et al. | 123/527 |

FOREIGN PATENT DOCUMENTS

| | | | |
|---|---|---|---|
| 7-131853 | 8/1982 | Japan | 123/527 |
| 8-126456 | 7/1983 | Japan | 123/527 |
| 59-99055 | 6/1984 | Japan | 123/527 |
| 60-6058 | 1/1985 | Japan | 123/527 |
| 1-24154 | 1/1989 | Japan | 123/527 |
| 94/24433 | 10/1994 | WIPO | 123/527 |

*Primary Examiner*—David A. Okonsky

[57] ABSTRACT

An improved fuel supply system (20), fuel tank (22 or 50), and fuel (30), whose use in small internal combustion engines provides greatly reduced emissions, longer engine life, reduced maintenance, higher reliability, and safety. These fuel tanks (22 or 50) are partially filled with a LPG fuel (30) and are also connectable to the fuel supply system (20) by a corresponding fuelling receptor (32 or 56). The fuel system (20) is itself comprised, in combination, of a fuelling receptor (32 or 56) which is then followed in series and in fuel flow communication by a fuel conduit (36), a fuel lock valve (38), another fuel conduit (40), a primary pressure regulator (42), still another fuel conduit (44), and finally a fuel-air mixer (46). The aforementioned design is the basic operation system to which may be added a secondary pressure relief valve (60), a fuel filter (64), a manual close-off valve (66), a fuel vaporizer (96), a heat sink (98), and other components in order that the fuel system (20), and fuel tanks (22 or 50) may function under different operating standards, conditions or environments.

20 Claims, 6 Drawing Sheets

5,542,398

LPG FUEL TANK, AND FUEL SUPPLY SYSTEM, FOR ENGINES

BACKGROUND—FIELD OF INVENTION

This invention relates to the fuel tanks, and fuel supply systems used in internal combustion engines and, specifically, to the portable, disposable/refillable, liquified petroleum gas (LPG), fuel tanks, and fuel supply systems, that are used in small internal combustion engines.

BACKGROUND—DESCRIPTION OF PRIOR ART

Presently small internal combustion engines like the ones used in lawnmowers, trimmers, portable pumps, and generators, or, chainsaws, outboard motors, vehicular transportation and others will generally use gasoline as their fuel source. Consequently, these engines will produce a great deal of atmospheric pollution for they contain very little anti-pollution devices or technologies.

Gasoline, the fuel which these engines use, has great difficulty in achieving a complete burn in the engine's combustion chamber. This results in the creation of a great deal of pollution in the form of unburned hydrocarbons, carbon monoxide, and oxides of nitrogen. Gasoline, during combustion, can also produce various amounts of sulphur, lead, and particulate pollutants. In addition, gasoline engines must also use a variety of anti-pollution devices, and catalytic converters in order to reduce these harmful emissions as much as possible. As a result, this greatly adds to the cost of fabricating a cleaner burning engine.

These engines can also be designed in models of four-cycle and two-cycle. Although both models create large amounts of contamination the two-cycle engines are in particular, exceedingly harmful, for they require the mixing or blending of both gasoline and oil in order to lubricate their internal working components during operation. Alternately, four-cycle engines separate these items and in doing so create much less exhaust pollution.

Presently, the fuel tanks used by these engines are simple liquid containers which must be vented to the atmosphere. This venting prevents the possibility of a vacuum or pressure build up due to engine fuel consumption or fuel evaporation, respectively. However, venting contributes to air pollution as the fuel, once evaporated, dissipates slowly through the vent and into the atmosphere. Refuelling these tanks also increases the rate of gasoline venting and evaporation thereby creating still further pollution.

As gasoline vapour is dissipated to the atmosphere it has a tendency to sink as it is a much heavier substance than air. This can create pockets of fuel vapour which can present a serious potential fire hazard. Gasoline spillage during refuelling and transportation further add to the pollution and fire risks as well. Furthermore, gasoline is also a toxic substance where the inhalation of its fumes over long periods or an accidental ingestion can cause serious health problems.

When equipment using gasoline is stored for long periods of time the fuel system should be purged of fuel as gasoline will, in time, leave gummy deposits which may clog engine components. Gasoline, during extended time periods, can even separate into different components. When this happens the fuel is rendered useless and if used could possibly damage parts of the fuel system or engine. Furthermore, decayed fuel should be disposed of safely as it remains a fire hazard and toxic substance. Prolonged storage of gasoline in equipment fuel tanks will also only increase the amount of evaporation into the atmosphere causing further atmospheric contamination. Large amounts of gasoline should, therefore, not be purchased but rather an amount which can be used preferably in a time period of a few months.

During normal operation, engines using gasoline accumulate various gum, sediment, carbon, and other deposits throughout their fuel systems, lubrication systems, and internal devices. These contaminates will in time reduce engine efficiency, and longevity while simultaneously increasing the maintenance costs associated with keeping these engines in top working order. Keeping these engines in top working order is of prime importance as an increased overall contamination to the atmosphere is the result of poor engine care.

As a consequence of all these problems a different approach was needed to further reduce the general waste and pollution inherent in these types of gasoline powered internal combustion engines. One approach resulted in the use of an electric motor whose electric power requirements were supplied by a very long extension cord which was, in general, plugged into a household electrical outlet. These motors are clean, efficient, much quieter and therefore, eliminated many of the inferior attributes associated with the internal combustion engine.

However, while succeeding in some aspects, this arrangement created other problems which were not present in the previously used engines. These problems, some of which are quite substantial, include:

a. Home outlets can only provide a maximum power output of 1800 watts for a 120 volt, 15 ampere circuit, and 3600 watts for a 240 volt, 15 ampere circuit. This limits maximum horsepower to approximately 0.75 horsepower and 2.0 horsepower respectively, as in general, only 80 per cent of the outlet's capacity should be used. This limits horsepower.

b. All outlets used to supply outside electrical equipment should be ground fault protected in order to prevent possible electrocution hazards. This adds extra costs.

c. The farther equipment is used from an outlet the larger the electrical cable's capacity must be in order to avoid a large voltage drop over longer distances. This adds cost and limits capability.

d. In areas containing many shrubs, trees, flowers, etc., etc., or where the terrain is rugged, the use of a cord becomes a great inconvenience. This increases working time and limits capability.

e. Areas where electricity is not available prohibits the use of such equipment. This limits capability.

f. Electricity, while a clean form of energy, is not an energy source but an energy carrier as it is generally made from existing forms of energy such as coal, nuclear, methane etc., etc. This creates pollution indirectly in other areas.

Therefore, an alternate approach was sought which could combine the favourable characteristics of both the engine and electric motor. The result, battery operated electric motors were used in an attempt to combine the best of both types of equipment. However, the result was not entirely successful. What transpired, was a combination of some of the good and bad aspects of both systems with the addition of some new inferior features not seen before. These are reviewed in greater detail below:

a. Although the household electrical outlet and extension cord were eliminated in favour of batteries, these batteries will discharge during use and, therefore, limit operational time. This is a new flaw limiting capability.

b. The electric motor's horsepower rating is limited to the output capacity of the battery which, in general, is not very large. This is a difficult problem to overcome using present battery technology as increasing battery capacity increases size and weight proportionally.

c. Battery recharging requires a long time and is another new flaw limiting capability.

d. As the ambient temperature drops battery energy retention decreases resulting in a reduced operational time. Still another new flaw.

e. The charge holding capabilities of batteries will diminish with age and use. This will, consequently, also reduce the operational time of the equipment. Yet another new flaw.

f. Motors using batteries are heavier than other equipment of similar purpose and so may make some handheld equipment presently used such as grass trimmers, hedge trimmers or chainsaws overly heavy and impractical. Still another new, capability limiting, flaw.

g. Batteries are expensive, and when worn or spent must be repurchased and reinstalled. An added expense other than fuel.

h. Batteries can be toxic. The cadmium in a rechargeable nickel-cadmium batteries is very toxic indeed. Thus, the disposal of such batteries must be performed safely otherwise further environmental damage may result.

i. Electricity as stated before is not an energy source but an energy carrier. Environmental pollution is indirectly created in other localities.

Therefore, the new invention described within this disclosure addresses the problems discussed above and provides a more effective solution for an optimal small horsepower engine in which drawbacks are minimized and advantages are maximized.

OBJECTS AND ADVANTAGES

Accordingly, the invention disclosed herein overcomes many of the drawbacks listed in the prior art, while also providing a more reliable, simpler and effective operation.

Therefore, some of the objects and advantages of this new invention are described below:

a. To provide small internal combustion engines with an inexpensive LPG (propane based) fuel supply systems.

b. To reduce the atmospheric pollution caused by the operation of small internal combustion engines.

c. To reduce the atmospheric pollution caused by refuelling.

d. To reduce atmospheric contamination, from fuel tank, and carburettor evaporation of fuel.

e. To minimize refuelling hazards, which in turn increases safety.

f. To increase the operational life of small internal combustion engines.

g. To reduce the maintenance costs associated with these small engines.

h. To increase the storage life of the fuel used by these engines.

i. To increase the engine's operational time by using larger fuel tanks or multiple fuel tanks.

j. To reduce the use of electric motors, whether electric cable or battery, and their inherent disadvantages.

SUMMARY

The invention disclosed herein provides for an improved operating fuel, fuel system, and fuel tank for use in small internal combustion engines.

The fuel tank itself is a conventional Liquified Petroleum Gas (LPG) fuel tank which is partially filled with a LPG fuel. This causes the LPG fuel to form a liquid and a gaseous portion and thus, provides a convenient source of vaporized fuel for use by the fuel supply system. The fuel itself consists essential of propane or a propane blend comprising propane and other hydrocarbons such as butane or propylene. These LPG fuels provide a well known source of clean hydrocarbon energy which if used in small engines can greatly reduce the unwanted and hazardous emissions of hydrocarbons, carbon monoxides, oxides of nitrogen, sulphur, lead, and particulate from internal combustion engines.

LPG fuels also provide a greater longevity in engine life due to their clean burning characteristics along with a concurrent reduction in maintenance time and costs. Refuelling is made safer by their use as they are just slightly heavier than air and dissipate very quickly. Their ignition temperature is also much higher than that of gasoline.

Once dissipated to the environment these fuels oxidize readily and therefore pose far less environmental danger when compared to gasoline or methane. Methane, unlike propane or propane blends, is a very powerful and persistent greenhouse gas, the concentration of which in the upper atmosphere is increasing at a rate similar to that of carbon dioxide.

Fuel carburation for an engine using LPG is also simpler than that of a gasoline design. Carburation in gasoline engines require complex components and more of them since gasoline is a liquid which must be vaporized whereas LPG is inherently a vaporized gas. Consequently, carburettors in LPG engines need no choke or accelerator pump. This allows for the use of a simple and inexpensive fuel-air mixer which will, therefore, reduce costs and increase reliability.

Since these low fuel consuming engines are used mostly in warmer weather their fuel systems can also be made much simpler. All that would be require, along with the fuel-air mixer, would be a pressure regulator, a fuel lock, a fuelling receptor, a disposable/refillable LPG fuel tank and some tubing. The fuel tank would include a pressure relief valve and an automatic or manual shut-off valve. The shut-off valve will also permit the tank to be recharged if desired.

Separate vaporizers are not needed in moderate or warm temperatures for the fuel tank will easily vaporize all that is required within the tank itself. However, when engines are used during colder weather a metal heat sink can be utilized to maintain the rate and quantity of fuel vaporization within the tank. This is accomplished by attaching one end of the heat sink to an engine hot spot, or another heat source if available, and the other end to the fuel tank. This can help supply the heat required to vaporize the LPG fuel. If need be, the pressure regulator or any other component can also be heated in this manner. In still colder weather the use of the heat contained in the engine's exhaust emissions can be used to heat the required components and in turn the fuel in these components. This can be accomplished by using the aforementioned metal heat sink and attaching it to any hot spot on the engine's exhaust system or by incorporating a heat exchanger to extract heat from the exhaust emissions. This allows small engines which lack liquid cooling systems to still heat their fuel or related engine components when needed.

Other components can also be added to the fuel supply system in order to add an increased measure of reliability, performance or safety. For, example, the addition of a manual close-off valve and a secondary pressure relief valve between the fuel lock and tank would add an increased degree of safety and convenance. Alternately, the manual close-off valve could be combined with the fuel lock thus permitting the secondary pressure relief valve to be omitted. A fuel filter could also be included so as to provide a greater degree of reliability. Other components, of course, may also be added so as to increase the reliability, performance or safety of the overall design.

Thus, the inherent advantages of this system are very impressive and some of these are summarized below:

a. Greatly reduced environmental pollution.
b. An increase in engine longevity.
c. Greater overall reliability in the operating system.
d. A reduction in maintenance costs.
e. A safer overall operation.
f. Less complex and fewer components.
g. LPG is a high octane fuel which allows for higher compression ratio in engines, thus, providing greater engine efficiency.
h. An existing distribution network of LPG tanks.

Although the preceding descriptions contain many specificities, these should not be construed as limiting the scope of the invention but merely providing illustrations of some of the presently preferred embodiments of this invention and thus, the scope of the invention should be determined by the appended claims and their legal equivalents, rather than by the examples given.

DESCRIPTION OF THE PREFERRED EMBODIMENTS

Figure 1:
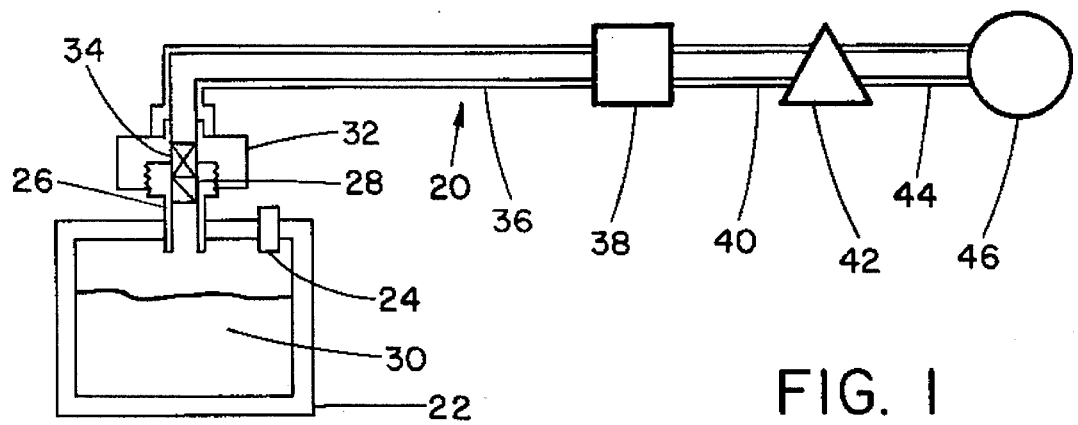
FIG. 1, is a schematic representation of a basic LPG fuel tank and fuel supply system, which operates in the gaseous mode.

This invention is comprised of a fuel supply system 20 to which is connected a fuel tank 22. Tank 22 is a portable, disposable, and optionally refillable container which can also function as a vaporizer. Fuel tank 22, as seen in FIG. 1, includes in its construction a primary pressure relief valve 24 and an automatic fuel shut-off valve housing 26. Housing 26 is provided with an external screw thread and an automatic fuel shut-off valve 28 mounted centrally inside. Tank 22 is only partially filled with a Liquified Petroleum Gas (LPG) fuel 30 which will, in turn, cause the LPG fuel to form a liquid and a gaseous portion within the fuel tank 22. The gaseous portion or head provides for the thermal expansion of the liquified fuel 30 within tank 22 while also supplying a source of vaporized fuel for use by the system 20. Thus, an upright or near vertical tank 22 will, therefore, render a convenient gaseous fuel head from which to draw the vaporized fuel 30 out of tank 22, by way of valve 28, in order to supply the system 20.

Connected to housing 26 is a fuelling receptor 32 which contains a probe 34 mounted centrally inside. Probe 34 is used to open valve 28 when the two are fully connected together. Thus, when probe 34 opens valve 28 it will allow the fuel 30, contained in the gaseous fuel head of tank 22, to flow through valve 28 and 34, and into the fuel supply system 20.

Receptor 32 is further connected to a fuel conduit 36. To the opposite end of conduit 36 is attached a fuel lock valve 38 which is followed in series by a fuel conduit 40, a primary pressure regulator 42, a fuel conduit 44, and finally a fuel-air mixer 46. Mixer 46 is further defined as a chokeless carburettor.

The foregoing description is the basic operational and functional system that will provide all of the previous mentioned benefits for a small internal combustion engine 48 (not shown). The remaining Figures show enhanced or alternate designs of the fuel supply system 20 or tank 22 disclosed of in FIG. 1. A further description of each component or design will now be detailed in order to clarify their operation.

DEFINITION OF TERMS a. Disposable/refillable, means that the LPG fuel tank is disposable and optionally refillable.

b. Fuel tank/vaporizer, means that the LPG tank can accommodate the dual functions of acting as a fuel tank and, acting as a vaporizer also.

Tank 22, is a portable, disposable/refillable, LPG fuel tank/vaporizer, which contains the liquified fuel 30 necessary for the operation of the internal combustion engine 48. Tank 22 is also secured sufficiently near or at a vertical or upright position, either by its own structure, a holding apparatus or a stand. This allows the gaseous or vaporized head of fuel 30 to remain in gaseous flow communication with the shut-off valve 28. Therefore, this manner of operation is referred to as the Gaseous Mode of Operation (GMO) for when the LPG fuel 30 leaves the tank 22 it will always be in a gaseous state. Notwithstanding, of course, the intermittent bouncing, during operation, of the LPG fuel 30 within tank 22 that may cause some small amount of liquid fuel to enter the fuel supply system 20 past the receptor 32. The fuel system 20 is unharmed by this small amount of liquid fuel 30 as it is quickly evaporated within its structure.

During normal operation, engine heat should not pose a problem for tank 22. Moreover, as the LPG fuel 30 is vaporized the temperature of tank 22 will drop yielding further protection while the engine is running. When the engine is stopped, heat will still radiate from the engine, however, the tank 22 having been cooled, during its operation, will be able to absorb this heat without difficulty. It is also preferable to allow air to freely circulate around tank 22. This allows tank 22 to more easily absorb the heat energy contained in the surrounding air so that the LPG fuel 30 may be more easily vaporized.

Tank 22 is generally made of painted steel but other suitable materials can be used for its construction. The colour of paint used is not restricted to any specific shade, lustre or colour. However, the colour black, during cooler weather, would help in the vaporization of the LPG as the colour black absorbs as well as radiates heat faster than any other colour. This fact can also be utilized, where needed, on any component in the system.

The fabrication of tank 22 can either be identical to or similar to the small conventional, disposable/refillable, propane canisters found in hardware stores, and department stores for use in propane heating torches, stoves, barbecues, and lanterns. The patent list below gives some examples of the fuel tanks which can be used. These patents, the disclosures of which are hereby incorporated by reference into this specification, further detail fuel tank design and construction techniques.

a. U.S. Pat. No. 4,006,838,

Invented by Richard S. Baumann and Ronald K. Raboin,

Issued 8 Feb. 1977.

b. U.S. Pat. No. 3,018,914,

Invented by Milo E. Webster,

Issued 30 Jan. 1962.

c. U.S. Pat. No. Des. 295,886,

Invented by Glen Dolton and Frank T. Schmidt,

Issued 24 May 1988.

These tanks are rugged, durable, inexpensive, and provide a ready made supply of standardized sizes, shapes, and fittings. They have also passed any existing safety regulations and have been consumer tested for decades. Each fresh tank used provides a new unit free of defects, whereas, old gasoline tanks may leak liquid fuel or fumes. The smaller tanks, like tank 22, have incorporated into their construction an automatic fuel shut-off valve like valve 28 with an accompanying structure like housing 26, along with a pressure relief valve like valve 24. The larger tanks also have a pressure relief valve but use a manual type of fuel shut-off valve instead of an automatic type.

Figures 2, 2A, 2B:
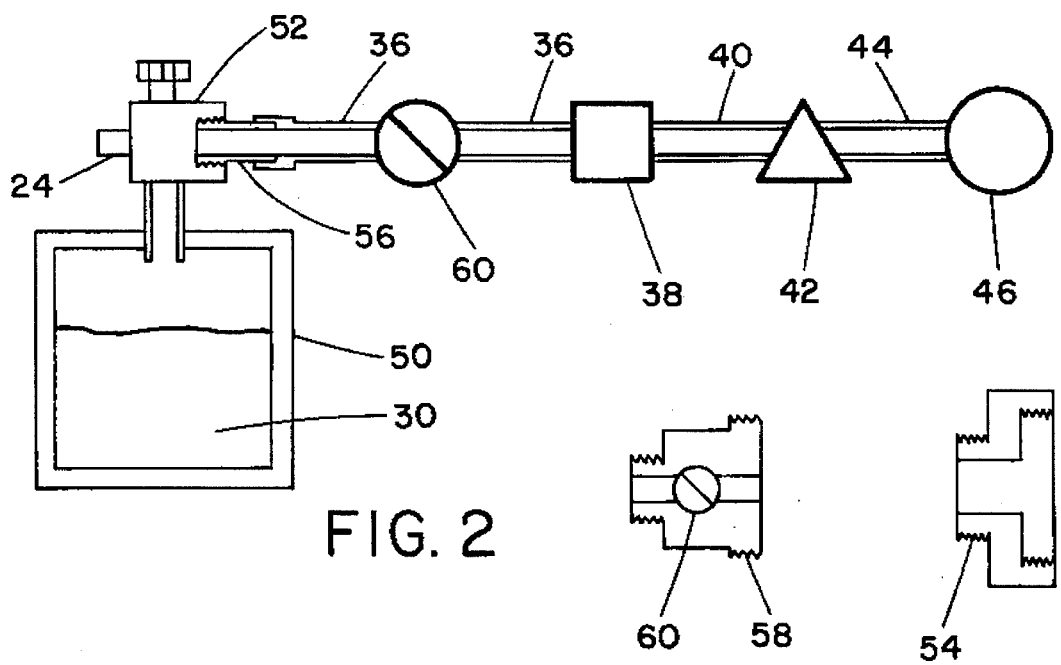
FIG. 2, is a schematic representation of a basic large LPG fuel tank and fuel supply system.
FIG. 2A, is a schematic representation of an adaptor.
FIG. 2B, is a schematic representation of another adaptor.

FIG. 2 shows one example of a larger and still conventional LPG fuel tank 50. The fuel tank 50, shown here, still contains liquid and gaseous fuel portions. Thus, tank 50 is very similar to tank 22 except for the repositioning of value 24 and the substitution of a manual fuel shut-off valve 52 in place of the automatic shut-off valve 28 and housing 26. Although tank 22 and tank 50 are basically interchangeable and perform similar tasks they, nevertheless, function in a slightly different manner. For example, in FIG. 1 the shut-off valve 28, of tank 22, is opened automatically by the probe 34 when the tank 22 is screwed into the receptor 32. When the tank 22 is removed, the probe 34, in receptor 32, disengages valve 28 and, thus, permits it to close in order to prevent the escape of fuel 30. There are no levers or knobs with which an operator can manually open or close it. This reduces operator error and allows the relief valve 24 to not only protect the tank 22 but also the fuel system 20 all the way through to the fuel lock 38. This, therefore, can reduce cost.

Tank 50, however, requires the operator to manually open or close valve 52 in order to release or stop the flow of fuel 30. The probe 34 will not open or close valve 52 as valve 52 is not an automatic type of shut-off valve. Additionally, the manual shut-off valve 52 may operate as a secondary back up to the fuel lock 38 whereas valve 28 does not have this capability.

Portable LPG tanks contain fuel weights ranging from approximately 0.4 kilograms (14 ounces) to 45.5 kilograms (100 pounds) hence providing a good variety of choices for the majority of the market. Other sizes, whether larger or smaller, can be supplied once the demand is recognized or a market established. If, however, different tank sizes or designs are used an adaptor 54, as seen in FIG. 2A, can be provided to connect the fuel tank 50 to the fuel supply system 20 when a mismatch of threads or size of fittings found on the fuel tank and fuelling receptor occurs.

Adaptors are, of course, fabricated to accommodate the task at hand and are not limited to any specific tank style, size or fuelling receptor design. They may, for example, be designed to accommodate the connection of fuel tank 50 to a fuelling receptor 56 as shown in FIG. 2. Alternately, they can be designed as an adaptor 58, as seen in FIG. 2B, so that tank 50 can be connected to receptor 32 in FIG. 1. A secondary pressure relief valve 60 has also been included in the construction of adaptor 58 so as to prevent any dangerous fuel pressure levels. Although their designs may be varied an adaptor should, preferable, be constructed of a non-sparking or low sparking, non-corrosive material such as brass, bronze, stainless steel or the like. Take note also, that when different fuel tank sizes are used modifications to the fuel tank holding apparatus or stand may be required so as to properly secure, support, and position the different fuel tanks used.

While valve 52 may offer the benefit of a secondary back-up to the fuel lock 38 it will require a secondary pressure relief valve 60 to be placed between the fuel lock 38 and the valve 52 as seen in FIG. 2. This prevents the possibility of any dangerous fuel pressure build up, that may be experienced, between these two closed points. However, where a back check valve is built into the shut-off valve 52, in order to permit excess pressure to bleed back into the tank 50 or where high gas pressures will not be encountered, then the relief valve 60 may be omitted. Valve 60, can also be incorporated into receptor 56 or 32, conduit 36, fuel lock 38 or any other component requiring pressure relief. It is a basic rule throughout this disclosure that any enclosed space, where pressures may possibly become excessive or dangerous, will require a system, method or device of pressure relief. They may include pressure relief valves, back check valves, other devices or methods. Where excessive pressures will not be encountered then pressure relief may be omitted.

LPG fuel tanks also provide a closed fuel system where the evaporation of the LPG fuel 30 to the atmosphere is all but eliminated. Emissions during refuelling, created by the evaporation and spillage of fuel, is also greatly reduced as a depleted tank is easily replaced with a fresh one.

Furthermore, these tanks would only be refilled by a manufacturer and can, consequently, be made much simpler and inexpensively than ones made for automobiles and the like. The eighty per cent fixed liquid level gauge otherwise known as a spit or bleed valve, the excess flow valve, and the fuel liquid contents gauge all would not be required, although, they could be used for convenience or additional safety. If, however, refilling occurs by other than the manufacturer, a manufacturer's representative or a qualified worker, then these aforementioned components should be installed back into the fuel tank for safety.

Another advantage, not mentioned above, is that these tanks give the equipment manufacturer the option to eliminate altogether the need for a fuel tank. When equipment, such as that above, is shipped, it is shipped, for safety reasons without fuel. Therefore, without the need to ship prefuelled equipment the fuel tank need not be fabricated as customers may purchase a charged tank, when required, at a local LPG tank distributor. The manufacturer, consequently, saves the cost of a fuel tank, the labour required to assemble it upon the equipment, and a savings in the weight and size of the equipment when it is shipped.

Other benefits and advantages include: no monetary outlay of funds need be spend on fuel tank designing, prototyping, and testing. Safety certifications, market studies, construction of plants, machinery and distribution facilities also are not needed.

An important point must be understood at this moment. The LPG tanks 22 and 50 that have been disclosed of thus far are critically important components in the operation of this invention. Firstly, they must be dual purpose when operating in the Gaseous Mode of Operation. That is, they must be both a fuel tank and a vaporizer. Secondly, where a convenient supply of gaseous fuel 30 is not readily available the fuel tanks should be portable, disposable and optionally refillable and, thus, unlike those found in automobiles, trucks, buses and others. The reason for this is that the above vehicles can travel to a refuelling station for a refill, whereas, it would be terribly inconvenient to bring a lawnmower, grass trimmer, chainsaw or other pieces of equipment to a refuelling depot each time refuelling is required. Therefore, portable, prefilled, disposable/refillable LPG fuel tanks allow this invention to become immensely practical and economical.

However, where a convenient tank of gaseous fuel 30 is readily available the fuel tank may be stationary. For example, an operator may tap into the gaseous fuel head found in the LPG fuel tank of a large vehicle. By comparison, these tanks though stationary upon the vehicle are extremely large and, consequently, if their proximity to the worksite is convenient their use would not deviate from the spirit of the inventor's intentions.

Another important aspect of using these disposable tanks is the substantial benefits which can be derived from the implementation of a recycling program. Presently, some, but not all, types of LPG fuel tanks are discarded by the general population and many, if not most, of these tanks are dumped at garbage landfill sites. This situation exists because, at present, there is no method or alternative available for consumers to recharge these tanks. Returning spent tanks to the manufacturer for recharging is presently impractical as there is no gathering of old canisters for such a purpose.

To correct this general waste of resources it is proposed that a deposit of a reasonable amount of money be paid by the consumer at the site of purchase as is the case with beverage bottles and cans. This money is then to be held in trust by the government and the interest received from this sum can be used to further environmental causes or finance other beneficial uses. Therefore, once the fuel is consumed, the customer may then returned the empty tank for a full refund of the deposit paid. The vendor would then collect all spent tanks and return them to the manufacturer as the manufacture makes a delivery of a fresh stock of LPG tanks. The manufacturer would then be obliged to recycle and recharge these spent tanks.

This method allows for a wasted resource to be recycled and all parties would benefit. Government can receive interest on the funds in trust and use these funds to provide additional benefits to its citizens. Since fabrication of a new tank is, therefore, not always required the manufacturer can lower its cost to the public. Consumers benefit from the reduced prices of LPG tanks while vendors and manufactures could create new jobs in the recycling of these tanks. These new jobs could then provide new payroll taxes for the government. The environment is also improved as a currently wasted resource is now recycled. Moreover, the use of such tanks would probably being displacing other more contaminative types of fuels as the price of these canisters begin to drop.

These fuel tanks, therefore, provide a excellent choice when selecting a LPG tank but not the only one. Other designs are conceivable if the need for such is required.

The fuel 30, used in this invention, is comprised mostly of the LPG propane or a propane blend comprising propane and other hydrocarbons such as butane or propylene. These gases are the most readily available, well known, abundant, and most widely distributed of the LPG gases. Although other blends of fuels are possible and available one good fuel blend, for engine operation, is called HD5. This fuel consists of a minimum of 90 per cent pure propane and a maximum 5 per cent propylene. It offers good all around performance, but, in general, the higher the propane content the better. Do not forget that whatever the fuel blend chosen it must be compatible for use in internal combustion engines.

Maximum storage time for these fuels are also a great deal longer than for gasoline thus providing less maintenance and operational down time. Being gaseous at normal temperature and pressure and approximately one quarter the weight of gasoline LPG fuels offer a quicker dispersal of fumes in an accidental discharge of fuel. When compared to gasoline the ignition temperatures of LPG fuels are higher, thus, providing still greater safety margins. Take note, that these gases are odourless and colourless and an appropriate odorant should, therefore, be added to the fuel as an indicator to alert personnel of a possible dangerous leak or situation.

Other choices for clean gaseous fuels, such as methane and hydrogen, are possible but they presently suffer from many drawbacks which, with the current state of technology, renders them impractical for present use. Should these drawbacks be overcome they may find market acceptance in this field. Some of these drawbacks are listed below:

a. There are at present no, widely available or distributed, small tanks of methane or hydrogen marketed to the public.

b. The working pressures of methane storage tanks is as high as 24,821,280 Newtons per square meter (3600 pounds per square inch). Hydrogen storage tanks have also very high pressures.

c. Storage tanks for both methane and hydrogen are very heavy and expensive to make.

d. Bulk storage of methane and hydrogen by manufactures is more expensive than LPG.

e. Fuel system components for methane and hydrogen must be built tougher and stronger than LPG systems thus adding to engine weight and manufacturing costs.

f. The useable methane or hydrogen which could be stored in a small tank would be but a small amount of what would be needed for a reasonable operational time.

g. Methane is a powerful and persistent greenhouse gas.

h. The small size of the hydrogen molecule permits hydrogen, as a gas or liquid, to leak through openings at higher rates than most other gases.

i. Hydrogen is not an energy source but an energy carrier such as electricity. Pollution is created elsewhere in its manufacture unless using benign methods like photoelectric cells or hydroelectric power.

j. Hydrogen can combine with certain metals causing them to become brittle (hydrogen embrittlement).

k. The energy density of methane and hydrogen is lower than that of LPG therefore requiring more fuel.

Methanol, an alcohol, is still another alternative. It can be made from coal, wood, and natural gas or other materials. It is a cleaner and cheaper fuel than oil and yields more horsepower and acceleration. However, methanol has many serious drawbacks. Some of these are described below.

a. Compared to gasoline, methanol releases much more formaldehyde; a potent carcinogen and contributor to smog. LPG fuels, contrastingly, emit negligible amounts.

b. Methanol's toxicity can burn skin and peels paint.

c. Methanol lowers nitrogen oxide emissions marginally and reduces carbon dioxide emissions by approximately 5 to 10 per cent when compared to gasoline.

d. Engines are sometimes hard to start when the temperature falls below 50 degrees fahrenheit.

e. The manufacture of methanol from natural gas produces great quantities of carbon dioxide. Production of methanol from coal creates even more.

f. Synthetic methanol is substantially more expensive to produce on an equivalent energy basis than is LPG.

g. Methanol is considered a toxic substance.

With dedicated or single-fuel LPG engines, which are designed for LPG fuels only, there is in general no decrease in power and no increase in fuel consumption. Furthermore, compression ratios can be raised to about 12:1 and emissions are greatly reduced. Compared with gasoline carbon monoxide emissions are reduced by up to eighty per cent. Oxides of nitrogen are about fifty per cent lower and unburned hydrocarbons are also relatively low. Emissions of lead, formaldehyde, sulphur, and soot are, in effect, negligible.

Therefore, the disclosure has shown that, at present, LPG fuels are the premier choice for a cleaner burning fuel for use in small engines as it provides many benefits over its competitors.

Referring now to FIG. 1, fuelling receptor 32 is constructed with an internally threaded receiver. This receiver can mate with the corresponding thread that is found on the automatic shut-off valve housing 26 located on tank 22. Furthermore, receptor 32, contains a probe 34 which extends outwardly from the centre of receptor 32. The function of probe 34 is to open the automatic shut-off valve 28, which is located in housing 26, but only when the receptor 32 and housing 26 are fully connected together. Therefore, when valve 28 is opened the gaseous fuel 30 stored in tank 22 will be allowed to flow through valve 28, and also the probe 34 of receptor 32, and into the fuel conduit 36 of system 20.

Fuelling receptors are not limited to any specific designs and can, therefore, be fabricated to connect directly to any LPG fuel tank large or small. Thus, fuelling receptor design can be like or similar to the conventional type used in propane hand torches, lanterns, stoves, or barbecues. Using these designs will provide a readily available product which is standard in design convention and has already been tried and tested for years.

One example of a conventional fuelling receptor is seen on the propane blow torch described in U.S. Pat. No. 3,018,914 by Milo E. Webster which issued 30 Jan. 1962. It is of simple construction and is easily connected to a fuel tank. Another example can be seen in the fuelling receptor designed by Richard D. Curtis in FIG. 7 of his U.S. Pat. No. 3,941,554 which issued 2 Mar. 1976. Alternately, when a fuelling receptor 56 is designed for a tank 50, as seen in FIG. 2, probe 34 is no longer required and is thus eliminated. Instead valve 52, governs the flow of fuel 30 by being turned on and off manually. Furthermore, the shape, thread type, and exterior dimensions of receptor 56 is designed to suite the larger LPG tank 50. This prevents tank 22 from being inadvertently connected without using a probe containing adaptor. A pressure relief valve 60 will also be needed between the fuel lock 38 and valve 52 if the possibility of a dangerously high pressure may be encountered there. Moreover, any fuelling receptors or other fuel system components can be made to swivel, pivot, rotate or turn so as to facilitate the connection of these parts.

Although fuelling receptors can be made from various substances they should, preferably, be made from a non-sparking or low sparking, non-corrosive material such as brass, bronze, stainless steel or the like. This is to protect operators during refuelling should a stray spark ignite any accidentally released fumes that may have created an explosion or fire hazard nearby. Using these types of metals also protects the threads from corrosion. Most of the other components and devices used are not prone to such mishaps and are, therefore, not required to be made from such materials.

The task of the fuel conduits, used in this invention, is to carry gaseous or liquified petroleum gas through the fuel system 20. They can be fabricated from a variety of materials some of which include steel, stainless steel, seamless steel tubing, metal reinforced flexible hose or brass. These conduits can be made to any suitable length required and so adapted to various tasks.

Referring once again to FIG. 1, conduit 36 acts as a fuel carrier channelling the gaseous fuel 30 to fuel lock 38. Fuel lock 38 is a valve that serves the purpose of preventing the flow of petroleum gas to the fuel-air mixer 46 when the engine is not running. Fuel lock 38 is, preferably, located upstream and as close as possible to the pressure regulator 42. Fuel lock 38 must also be controlled electrically or mechanically either by vacuum from the engine, or centrifugal action. An electric fuel lock valve 38 must have a vacuum switch or an oil pressure switch connected in series with it. This allows an absence of either vacuum or oil pressure to shut off the electric current to the fuel lock 38 and cause it to close.

It must also be remembered that fuel lock 38 may be designed as a manual valve in a fashion similar to or identical to the valves 52 or 66. This, as with the valves 52 or 66, would mean that the fuel lock 38 could only be opened or closed manually by an operator. A manual fuel lock 38 would provide results similar to the automatic designs first described above, however, the safety aspects of such a design would have some inherent deficiencies. One of these deficiencies occurs when the vaporized fuel 30 is allowed to escape into the atmosphere if the operator is not diligent in quickly starting the engine when the manual fuel lock 38 is first opened. This can create the conditions for a fire or explosion hazard while also contributing to an increase in air pollution. Secondly, a proper fuel/air mixture is harder to achieve when the mixer 46 is constantly expelling vaporized fuel even when it is not being drawn by the engine vacuum. As a result of this improper fuel/air mixture the engine may fail to start promptly. In turn, this may create conditions that promote or increase the chances of misfires, backfires and greater atmospheric pollution. Consequently, it can be seen that this is a wasteful and more dangerous technique which would, in general, be a less than preferable design to employ.

Once the petroleum gas 30 leaves fuel lock 38 it enters and then travels through fuel conduit 40 to then exit into the primary regulator 42. The function of regulator 42 is to lower the high gaseous pressure of the fuel 30 found in the fuel tank to the working pressure used by the fuel-air mixer 46. This facilitates the maintenance of a constant fuel density. One regulator should be sufficient for the task, however, if two are required they can be placed in series for a two stage reduction in pressure.

Once the regulator 42 has lowered the petroleum gas pressure to the desired working level, fuel 30, exits regulator 42 and enters conduit 44. Here the fuel 30 is directed by conduit 44 to finally enter the fuel-air mixer 46.

Mixer 46 is basically a chokeless carburettor whose function it is to meter and mix the gaseous fuel 30 with the incoming air. Mixer 46 should provide the correct fuel/air ratio over the full range of speeds and loads, including start up and warm up, that will be experienced by the internal combustion engine 48.

Unlike gasoline which is a liquid, fuel 30 enters the mixer 46 already gasified. This allows a simpler carburation system to be used instead of the complicated carburettors required by gasoline. As a result, chokes and accelerator pumps can be eliminated. Thus, fuel use efficiency is improved and vapour lock is eliminated.

Air used by the fuel-air mixer 46 must be filtered. This prevents dirt particles and other unwanted foreign matter from entering the engine 48 and causing damage. Filtering of air is not new and is required in most internal combustion engines.

The invention disclosed of thus far has many advantages over the prior art. Some of these are summarized below:

a. A reduction of parts over existing LPG fuel systems used in internal combustion engines like automobiles, trucks, buses and the like.

b. LPG components need not be as rugged, heavy or strong as those used by methane and hydrogen and are, therefore, less expensive to make.

c. By using a portable, disposable/refillable, fuel tank the original equipment manufacture may, if desired, delete the fuel tank when shipping new machines from the factory.

d. Greatly reduced engine and fuel system maintenance.

e. Carburation is much simpler and more efficient than for gasoline.

f. The octane rating of LPG is higher than that of gasoline, thereby, allowing the use of higher compression engines with their related advantages.

g. Atmospheric exhaust pollution is greatly reduced.

h. The combustion efficiency of LPG fuels is greater than for gasoline.

i. LPG fuels promote longer engine life when compared to gasoline.

j. Storage time of LPG fuel is greater than that of gasoline.

k. Fuel evaporation from system components is all but eliminated since LPG units are closed systems.

l. During refuelling, LPG fuels system are generally safer and less polluting to use than gasoline.

m. The unburned hydrocarbons of propane do not react with sunlight as readily as those produced by gasoline, thus creating less photochemical smog.

n. Unlike methane, LPG is a minor greenhouse gas.

o. Readily available supply of inexpensive LPG tanks.

p. Possibility of fuel tank recycling—an existing wasted resource.

q. LPG fuels have a higher energy density than that of methane or hydrogen.

r. While propane is an asphyxiant it is non-toxic as opposed to substances such as gasoline or methanol.

ENHANCED VERSIONS OF THE INVENTION

The invention disclosed of thus far is the basic design upon which the enhanced versions are built. The basic design provides a functional, reliable and safe product that provides all the previous stated benefits. However, while the enhanced versions can add a measure of improvement to these qualities they do so at a price. That price includes not only added costs but also greater equipment weight and less compact equipment design. Each design has its own merits and the final selection of which should be based upon the expected task to be performed by the equipment used. It should also be noted that these versions show some but not all of the possible variations conceivable.

Figure 3:
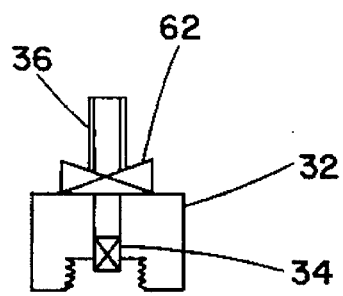
FIG. 3, is a schematic representation of an excess flow valve connected to a fuelling receptor.

Referring now to FIG. 3, the incorporation of an excess flow valve 62 into the receptor 32, although not mandatory, would increase the safety of the overall operation. Valve 62 should, preferably, be located as close as possible to the tanks 22 or 50. They can also be used on the fuel tanks 22 or 50 or alternately employed by themselves in a device similar to that of an adaptor 54 or 58. The excess flow valve 62 would stop the flow of fuel 30 and, thus, prevent it from escaping, should a rupture, accidental disconnection or malfunction occur to a fuel conduit or fuel system component. This would not only minimize fuel 30 from escaping into the atmosphere and causing further pollution but it would also reduce the possibility of a fire or explosion hazard. Note also, that all fuel conduits must have a fuel flow capacity greater than the rated flow capacity of the tank's excess flow valve 62. This is to insure that the flow valve 62 will only close when a malfunction occurs, to the fuel supply system 20, creating fuel flow in excess of normal consumption.

Figure 4:
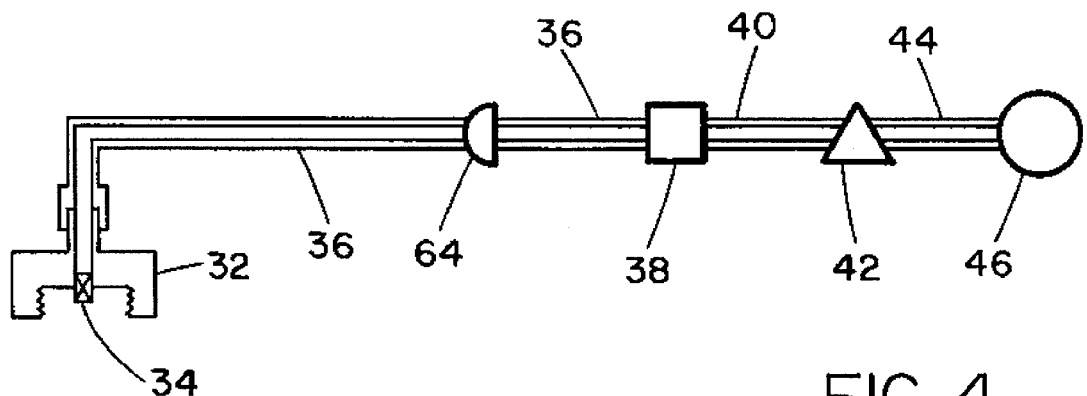
FIG. 4, is a schematic representation of an enhanced fuel supply system identical to the design found in FIG. 1 but for the addition of a fuel filter.

Another method to increase reliability is to incorporate the use of a fuel filter 64 into the fuel supply system 20, as seen in FIG. 4. Filter 64 increases equipment reliability by removing any unwanted impurities that are found in fuel 30 or acquired by the equipment during storage or refuelling. This keeps the components of the fuel system 20 and that of the engine 48 cleaner, and thus, in a more functional state.

However, it must be remembered that when operating in the GMO the liquified fuel 30 is evaporated or vaporized within the fuel tank itself. Consequently, any solid particle contaminants that may be found there will not be vaporized and are, thus, left behind in the tank. Therefore, if an operator is careful not to contaminate the fuel supply system 20, during storage or refuelling, the gaseous head of fuel found at the top of tanks 22 or 50 will provide a clean source of vaporized fuel. As a result, the fuel filter 64 is not always necessary when operating in the GMO if the shut-off valves 28 or 52 remain in gaseous flow communication with the gaseous head of fuel found in the fuel tank.

If a fuel filter 64 is used in the system 20, then the fuel lock 38 can be combined with it to produce a fuel filter/fuel lock combination device. If, as seen in FIG. 4, a separate fuel lock 38 and fuel filter 64 are used then the fuel filter should, preferably, be located upstream of the fuel lock.

Fuel filters may also be placed in positions other than the fuel supply system 20. They may be placed, for example, in an adaptor specifically made to hold and support a fuel filter. By including a filter in an adaptor the fuel 30 is filtered much sooner while also being easily disposed of and replaced with a fresh unit when needed.

Figure 5:
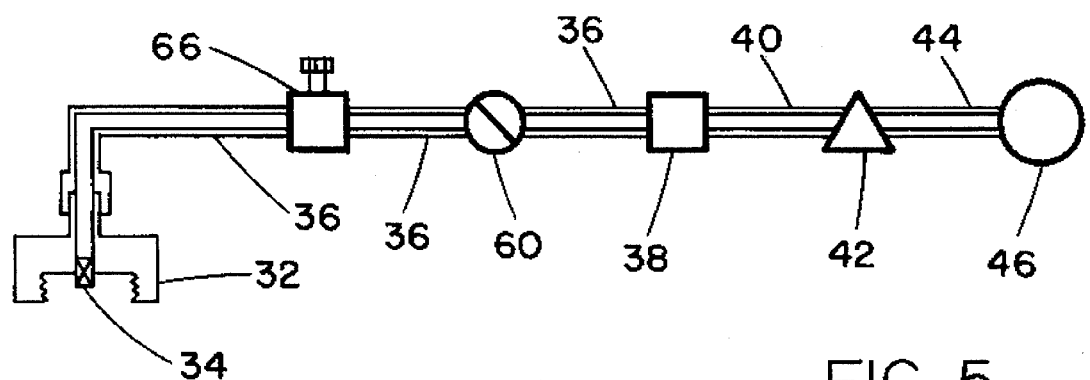
FIG. 5, is a schematic representation of an enhanced fuel supply system identical to the design found in FIG. 1 but for the addition of a secondary pressure relief valve, and a manual close-off valve.

FIG. 5, reveals the use of a manual close-off valve 66 along with a secondary pressure relief valve 60. Valve 66 can be located at or near the refuelling receptor 32. However, a pressure relief valve 60 should then be placed between fuel lock 38 and the valve 66 if, between these two closed points, the possibility of dangerously high pressures may be experienced. Take note that relief valve 60 may be omitted where a back check valve is built into the close-off valve 66 in order to permit excess pressure to bleed back into the tanks 22 or 50. Placing valve 66 at this location would further reduce atmospheric contamination as refuelling causes fuel 30, already in the system 20, to be lost when a spent tank 22 is replaced. When closed, it also functions as a back up to the fuel lock 38 so as to prevent the escape of fuel during times when the equipment is stored for long periods.

An alternative or replacement to using a manual close-off valve 66, at or near the refuelling receptor 32, would be to use a one way check valve 68 (not shown). This would be a more automatic method than the manual valve 66 and thus possibly safer.

Figure 6:
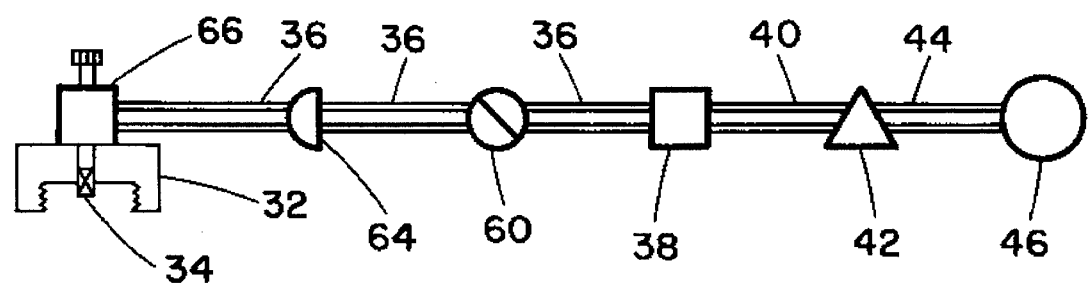
FIG. 6, is a schematic representation of an enhanced fuel supply system similar to the design found in FIG. 5 but for the addition of a fuel filter and some combined components.

FIG. 6 shows a design similar to that of FIG. 5 but with the valve 66 incorporated into the receptor 32 and the addition of a fuel filter 64. Incorporating valve 66 with the receptor 32 does provide for a more compact design and an associated reduction in fabrication and assembly costs.

Figure 7:
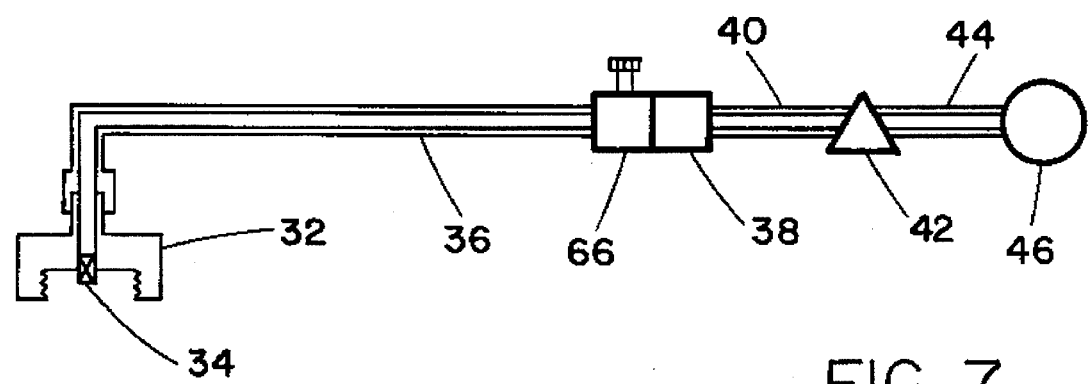
FIG. 7, is a schematic representation of an enhanced fuel supply system identical to the design found in FIG. 1 but for the addition of a manual close-off valve incorporated into the fuel lock.

It may be advantageous at this point to combine a fuel lock 38 with the manual close-off valve 66 as seen in FIG. 7. This is an alternate arrangement which is identical to FIG. 1 but for the insertion of a manual close-off valve 66 into the fuel lock 38. This new combination eliminates the closed area between the valve 66 and the fuel lock 38, thus, enabling the secondary pressure relief valve 60 to be omitted. Safety is still maintained, but the expense of the relief valve 60 is saved.

Figure 8:
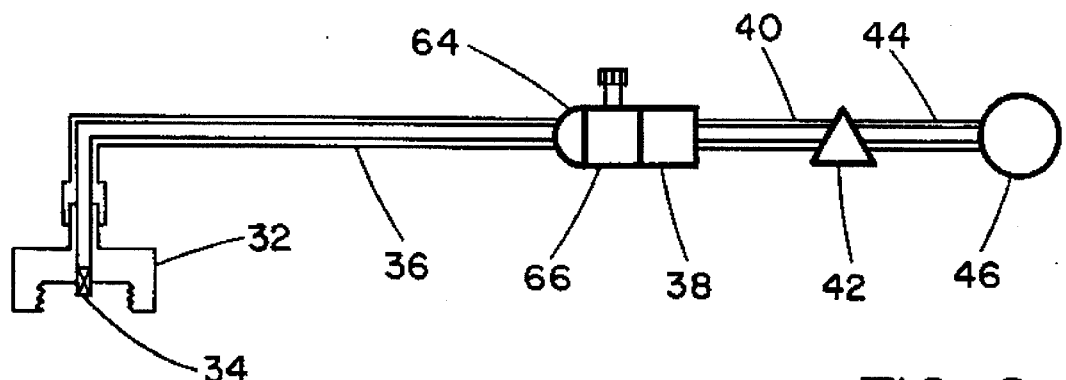
FIG. 8, is a schematic representation of an enhanced fuel supply system identical to the design found in FIG. 7 but for the addition of a fuel filter.

FIG. 8 discloses a fuel supply system 20 identical to FIG. 7 but for the insertion of a fuel filter 64. Fuel filter 64 as discussed before increases reliability by removing any unwanted impurities from the fuel 30. The arrangement here also demonstrates the use of a tri-component part or filter/valve/lock device.

Increasing reliability increases equipment up time but there are also other ways that will increase up time. One of those ways is to be able to increase the size of the fuel tank 22.

Figure 9:
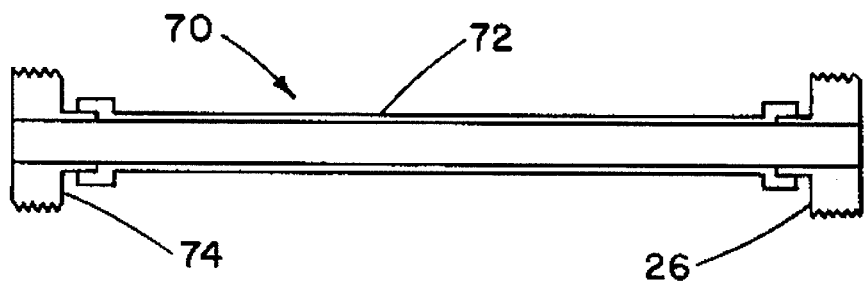
FIG. 9, is a schematic representation of a fuel conduit extension.

Therefore, in addition to providing fuel transportation a fuel conduit, as seen in FIG. 9, could be used as a fuel conduit extension 70 in a fashion similar to a pneumatic extension hose. Extension 70 could be a hose that would connect the receptor 32, on the equipment, to a larger separate and remote fuel tank 50. Extension 70 is comprised of a shut-off valve housing 26 less valve 28, a fuel conduit 72, and a fuel tank connector 74. If tank 22 is used instead of tank 50 then the connector 74 can be replaced by a fuelling receptor 32 in order to avoid the use of an adaptor. However, when receptor 32 is used, as a substitute, then the deleted valve 28 must be reinstated back into the valve housing 26 so as to prevent the escape of fuel 30. Valve 28 may only be omitted if housing 26 on extension 70 is first connected to the refuelling receptor 32 located on system 20. Then receptor 32 on extension 70 may be connected to the fuel tank 22. If this sequence is disregarded, then, fuel 30 will escape from fuel tank 22. Again this is but one arrangement. Extension 70 can be designed to connected any fuel tank to any fuelling receptor. It is a simple matter of fabricating suitable component connectors for the task at hand.

Figure 10:
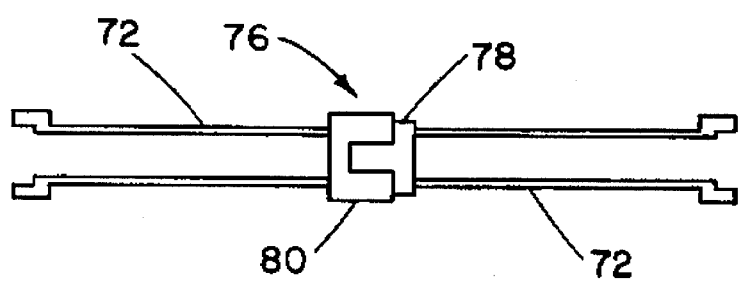
FIG. 10, is a schematic representation of a partial fuel conduit extension incorporating a quick disconnect coupling.

Extension 70, as seen in FIG. 10, can also be made more versatile by including a quick disconnect coupling 76 in its construction. Coupling 76 is basically a device similar to those used in pneumatic operations or to those found in LPG barbecues to quickly disconnect fuel tanks. Coupling 76 is comprised of two parts. First, a male quick disconnect coupling half 78, which mimics the receptor 32, is generally connected to the fuel supply system 20 side. Secondly, a female quick disconnect coupling half 80, which mimics housing 26 and valve 28, is connected to the fuel tank side. Thus, coupling half 80 will automatically close the fuel tank side, to thereby prevent the escape of fuel 30, when it is disconnected from coupling half 78.

The design of the tanks 22 and 50 can also be modified by using a quick disconnect coupling 76. This can be accomplished in two ways. The first technique is to simply attach the female disconnect half 80 to the tanks 22 or 50 so as to replace housing 26 and valve 28, or valve 52 respectively. The male disconnect half 78 is then connected to the fuel supply system 20 so as to replace fuelling receptor 32 or 56 respectively. Thus, the two can easily be connected and the equipment made operational. If, however, the tanks 22 or 50 require some additional space, a different location or for whatever other reasons, then, the second technique can be used.

Figure 11:
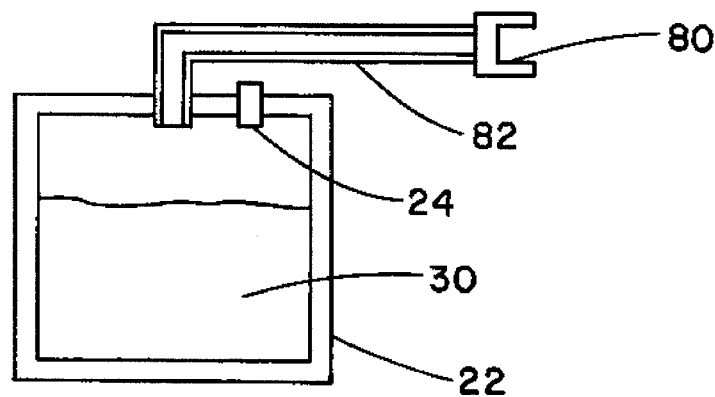
FIG. 11, is a schematic representation of a LPG fuel tank incorporating a quick disconnect coupling and a fuel conduit.

The second technique, as seen in FIG. 11, attaches one end of a fuel conduit 82 to the tanks 22 or 50 first. Next the female disconnect half 80 is attached to the other end of conduit 82. The male disconnect half 78 is connected as before.

Another favourable aspect of using the arrangement disclosed in FIG. 11 is that this design allows for maximum functional usage of the fuel tank. The fuel tank, for example, may be quickly disconnected, disposed of, and then replaced with a fresh tank. This makes it portable, disposable, and refillable. Alternately, the fuel tank may be constructed to be a permanent part of any equipment, machinery or vehicle. In this design, and without any adjustments, the female disconnect 80 can be quickly unplugged from the male end 78 and then connected to a refuelling depot so as to be recharged. Once charged the operation is reversed and the female disconnect 80 is replugged back into the male end 78. This, of course, is best utilized when a refuelling depot is in close proximity to the site of operations. If very large fuel tanks are used then a separate refuelling receptor, instead of female disconnect 80, can be used to charge the fuel tank with fresh fuel.

Thus, these arrangements, replace housing 26 and valve 28 or valve 52 with a female disconnect 80. Receptor 32 and probe 34, or valve 56, are in turn replaced by the male disconnect half 78. As a result, tanks 22 and 50, though modified, will still provide the same supply of vaporized fuel. Consequently, coupling 76 allows various pieces of equipment or different fuel tank sizes to be easily substituted so as to suit the task at hand.

Fuel tank positioning can also take another approach. They can, for example, be carried on an operator's back (not shown) in a similar fashion as air tanks are carried by a scuba diver. By carrying the fuel tanks on the operator's back the equipment weight is more uniformly distributed upon the operator's body. This reduces fatigue as the equipment, now being lighter, is more manoeuvrable in the operator's hands. Thus, the use of a quick disconnect coupling 76 in some of these designs will facilitate equipment or fuel tank changes for the operator.

Figure 12:
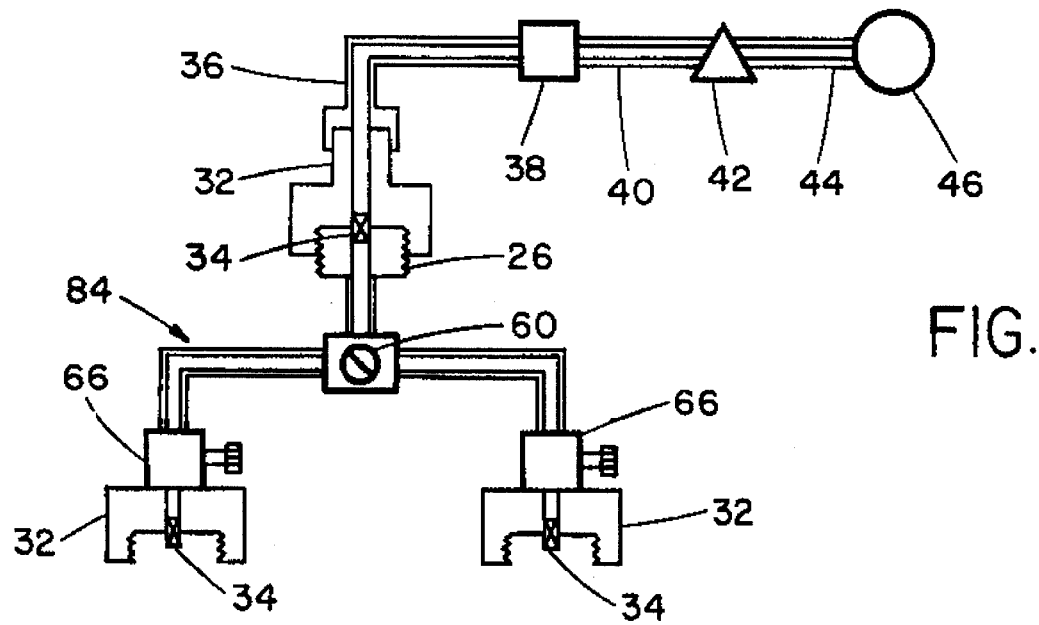
FIG. 12, is a schematic representation of a basic fuel supply system using a multi-hookup fuel conduit for paralleling LPG fuel tanks.
Figure 13:
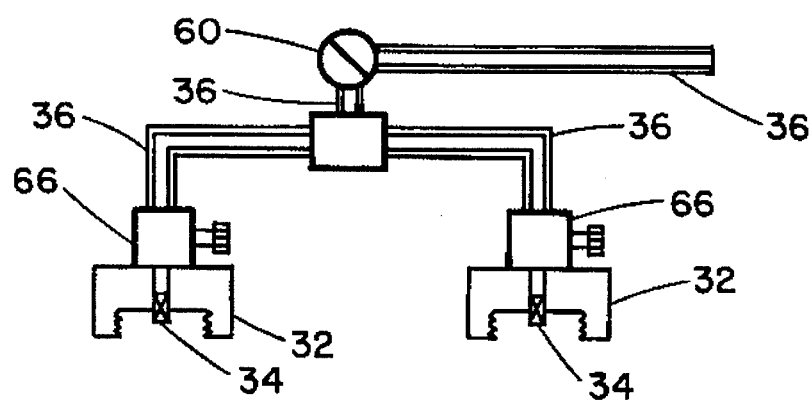
FIG. 13, is a schematic representation of a partial enhanced fuel supply system using a plurality of parallelled refuelling receptors with individual manual close-off valves.
Figure 14:
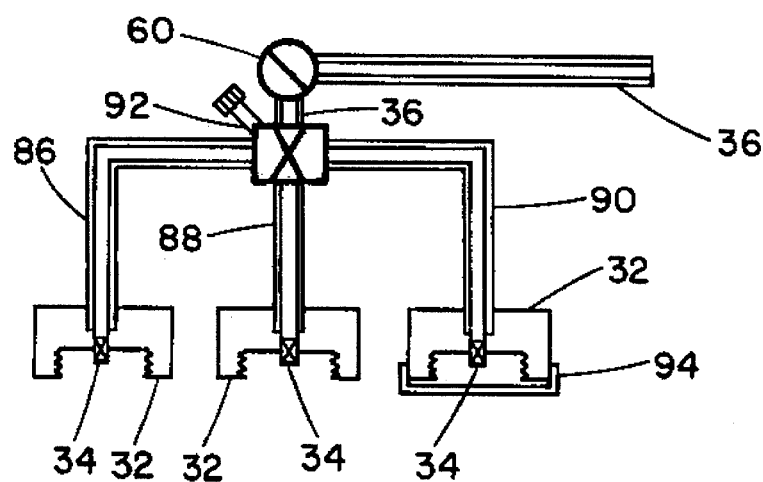
FIG. 14, is a schematic representation of a partial enhanced fuel supply system using a plurality of parallelled fuelling receptors and controlled by a central close-off valve.

Fuel conduit extensions, like extension 70, can also be designed to parallel more than one fuel tank in order to increase the total net fuel capacity to any desired amount. Using a multi-hookup fuel conduit 84, as seen in FIG. 12, will provide a functional arrangement. Note also, that the quantity, of fuel tanks used, is not limited to any specific number. Paralleling more than one receptor 32 for the fuel system 20, as seen in FIG. 13 and 14, will also allow a like number of fuel tanks 22 or 50 to be connected. Fuel conduits 86, 88, and 90 would connect receptors 32 to conduit 36. When paralleling fuel tanks 22 or 50, a manual close-off valve 66 or a one way check valve 68 must be used to prevent the escape of fuel 30 out of any unused receptor 32. This can be accomplished by placing a close-off valve 66 or check valve 68 at each receptor 32 or by including a central close-off valve 92 at the cross point or intersection of all the fuel conduits 86, 88, 90, and conduit 36. This will close or open all fuel conduits simultaneously. Remember to include a secondary pressure relief valve 60 between any two closed points where pressures may increase to excessive or dangerous levels.

The simultaneous closing and opening of all fuel conduits, by using a central close-off valve 92, can also be used on the multi-hookup fuel conduit 84, but only if a similar design as seen in FIG. 14 is observed. That is replacing valve 60, in FIG. 12, with valve 92 and moving valve 60 downstream of valve 92 if it is still required. This would eliminate the need for any manual close-off valves 66 or valves 68 found on conduit 84.

Having more than one valve 66 or 68, however, does offer the benefit of being able to change tanks 22 or 50 while still leaving the engine 48 running as the engine would operate on the other tanks that still have fuel. A cover cap 94, which can be threaded or non-threaded and easily made of plastic, should also be used to cover any unused openings on fuel tanks 22 or 50, fuelling receptor 32, adaptors 54 or 58, extension 70, couplings 76 or 78, or multi-hookup fuel conduit 84. This prevents any accidental contamination of the parts by dirt or other debris and also helps prevent corrosion. Other materials for cap 94 are, of course, available.

The disclosure has, until now, discussed the invention using the LPG tanks 22 or 50 as a storage apparatus and as a vaporizer. The liquified fuel 30, after vaporization in the tank, remained thereafter, a gas throughout the fuel system 20. An alternative method will now be disclosed.

ALTERNATE VARIATIONS OF THE INVENTION

Figure 15:
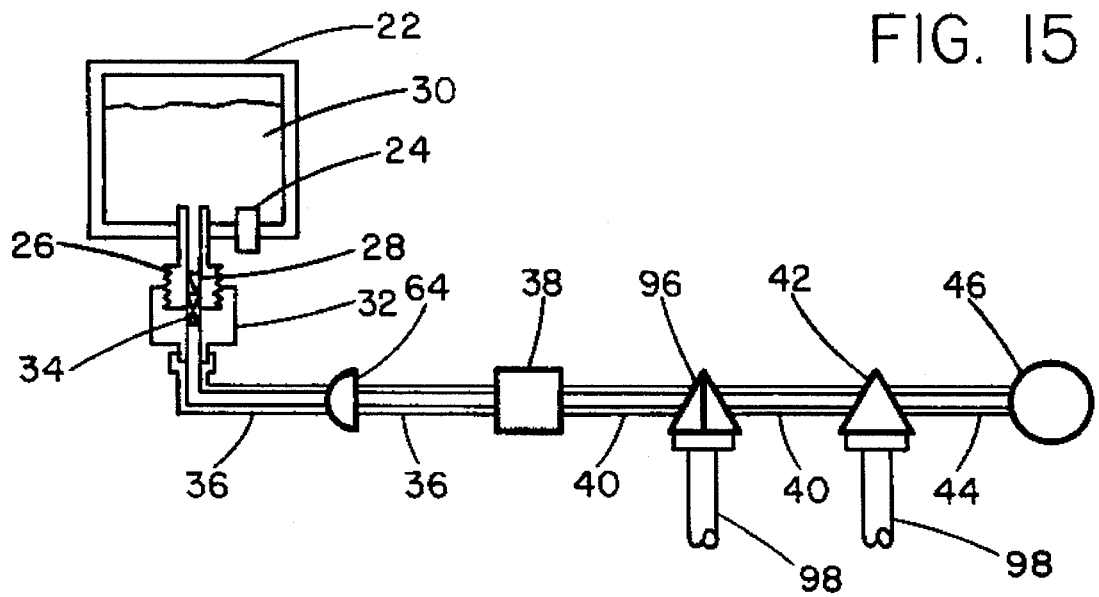
FIG. 15, is a schematic representation of a basic LPG fuel tank, and a fuel supply system which operates in the liquid mode of operation.

FIG. 15, shows another method of functionality that is possible, wherein the fuel is not vaporized or only partially vaporized in the upside down fuel tanks 22 or 50. This is called the Liquid Mode of Operation (LMO). Here, the fuel 30 is kept as a liquid or gas/liquid mixture prior to any pressure regulator 42. Thus, when the liquified fuel 30 reaches regulator 42 it is required to be in a gaseous state. As a result, a fuel vaporizer 96 or equivalent device must be placed prior to any regulator 42. However, it should be noted that regulator 42 is able to vaporize, for short periods of time, small quantities of liquified fuel 30 during the engine start up. This helps to ensure that all the liquified fuel 30 will be vaporized prior to the fuel-air mixer 46. Therefore, this alternate variation, of the fuel supply system 20, will produce similar results to those that are found in GMO designs, however, in order to provide these similar results certain changes had to be first implemented.

The first of these changes requires that any fuel system component, used up to and including the regulator 42, have at least a liquid fuel rating. Secondly, a fuel filter 64 should, preferable, be used when operating in the LMO as sediment, dirt, rust, or other impurities may have contaminated the LPG fuel 30 from within the fuel tank itself or, prior to its placement there. It should also be noted that if fuel 30, whether in a liquid or gaseous state, is filtered or guaranteed clean prior to and during its injection into the fuel tanks 22 or 50 and the fuel tanks themselves are free of any contamination the fuel filter 64 may then be omitted.

When using the GMO, however, the LPG fuel 30 is evaporated within fuel tanks 22 or 50, thus, leaving behind these aforementioned types of solid contaminates. This will, therefore, present to manufacturer the option, when in the GMO, of including into or deleting from the fuel system 20 the fuel filter 64.

The third change necessitates the use of a fuel vaporizer 96, irrespective of and separate from fuel tanks 22 or 50. When operating in a LMO tanks 22 or 50 do not actually vaporize the liquid fuel 30 but, rather, act only as storage apparatuses for it. However, in the LMO the bulk of the liquified fuel 30 must be vaporised outside the fuel tanks, thus, mandating the use of a fuel vaporizer 96.

Figure 16:
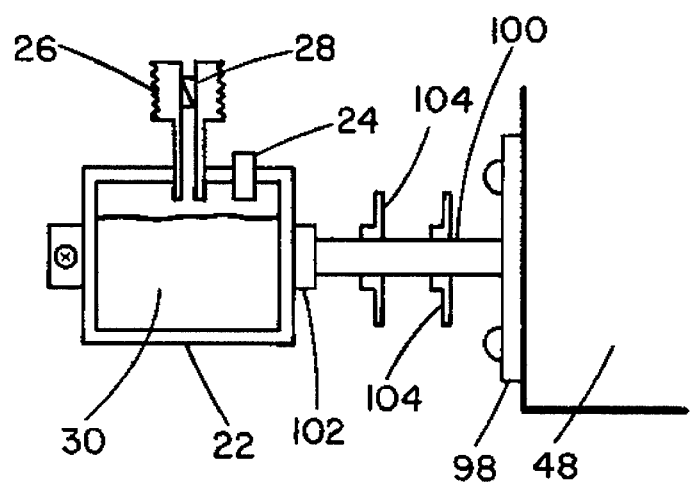
FIG. 16, is a schematic representation of a metal heat sink attached to an internal combustion engine and a fuel tank.
Figure 17:
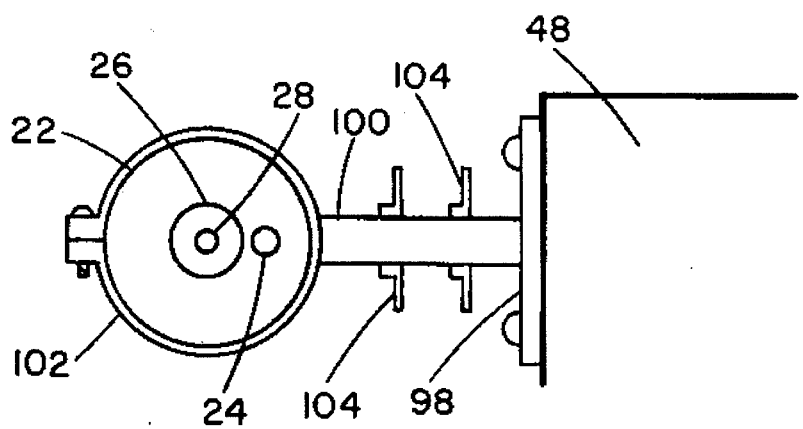
FIG. 17, is a schematic representation of an alternate view of the apparatus found in FIG. 16.

Vaporizer 96, to explain further, may comprise one specific individual component for the vaporizing of the liquified fuel 30 or it may comprise a group of components which accomplishes the same result. For example, if a certain piece of equipment is used only during periods of warmer weather the fuel supply system 20, up to and including the regulator 42, should in most cases be sufficient in providing the necessary heat energy to insure proper fuel vaporization before it leaves the regulator 42. The heat used by the vaporizer 96, in this example, is drawn from the fuel supply system 20 to the vaporizer 96 by way of their natural interconnections. Thus, the heat energy absorbed by the fuel supply system 20 from its surroundings should be sufficient to offset the heat drain caused by the vaporizer 96. If, however, the heat energy provided by system 20 is insufficient for proper fuel vaporization a number of alternative remedies can be employed to address this problem. One remedy is to use a heat sink 98 in order to transfer heat from another source. As seen in FIGS. 15, 16, and 17, heat sink 98 can be attached to any hot spot located on the engine 48 or its exhaust system. Its opposite end can then be attached to the vaporizer 96 or to any other component or group of components that may require heating. Heat will then travel from the engine 48 to the component by way of heat sink 98. An example, as seen in FIGS. 16 and 17, shows the fuel tank 22 operating in a gaseous mode and being heated by heat sink 98.

Additionally, basic physics states that as gases drop in pressure they also drop in temperature. Therefore, it may be necessary to heat regulator 42, in cooler temperatures, so as to keep it from frosting or freezing as it lowers the pressure of the fuel 30. An example is seen in FIG. 15.

Heat sink 98 should be fabricated from a good heat conducting substance such as copper, aluminum, steel, or other suitable materials. Heat sink 98 should also be firmly attached to both the heat source and the components requiring heating so as to supply maximum heat transfer. One method of attachment, as seen in FIGS. 16 and 17 is to use a heat sink 98 and attach it to a metal holder 100 which is in turn fastened to a metal ring strap 102. Thereafter, the opposite end of heat sink 98 is attached to a hot heat source as previously described. Additionally, a metal heat fin 104 can be used to regulate the flow of heat by acting as a type of heat control dam. The greater the number of fins the cooler the temperature at tank 22. These fins can thus be used to prevent the overheating of the fuel 30. A similar approach can be used to heat fuel tank 50 or any other component in the fuel supply system 20 whether operating in the GMO or the LMO.

Figure 18:
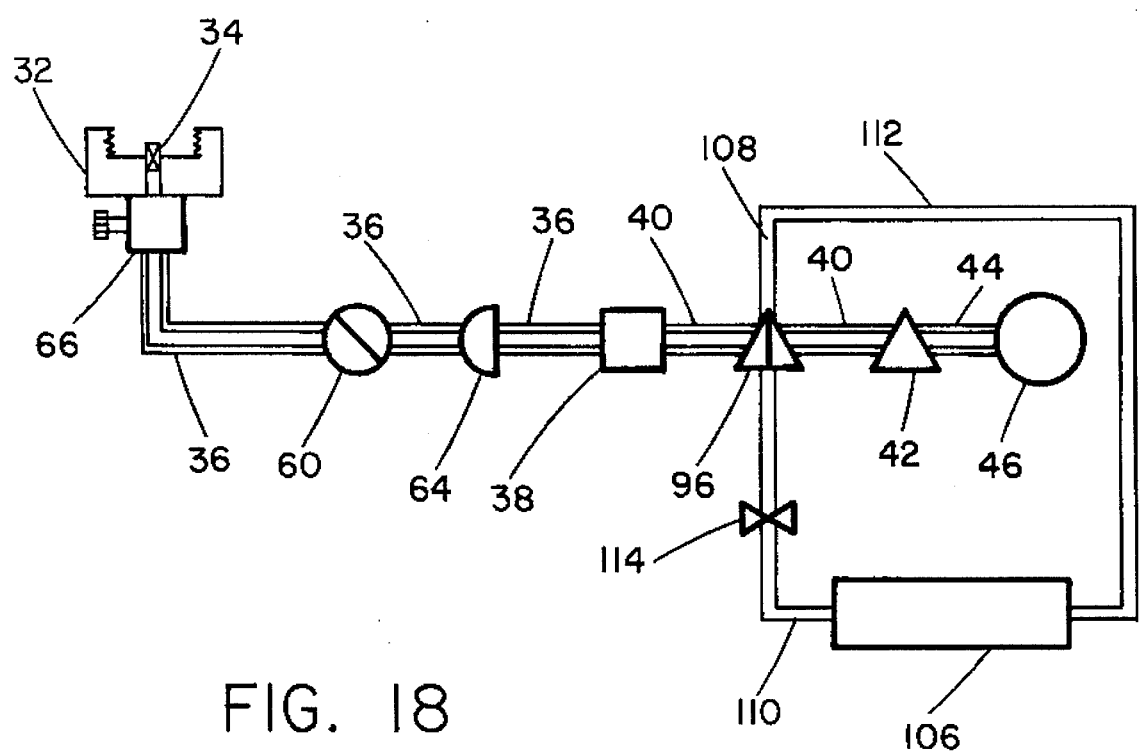
FIG. 18, is a schematic representation of a basic LPG fuel tank and, an enhanced fuel supply system which operates in the liquid mode of operation and which uses a vaporizer heated by the liquid cooling system of the engine.

Another source of heat energy can be found in engines containing a liquid cooling system 106 and a coolant 108 as seen in FIG. 18. A liquid heating conduit 110 and a liquid heating conduit 112 can, respectively, be utilized to transport and then return coolant 108 from the cooling system 106 to the vaporizer 96 and back. Heat energy contained in the coolant 108 can then be used to vaporize the liquified fuel 30. In effect, vaporizer 96, would act as a heat exchanger and take the heat energy contained in coolant 108 and transfer it to the liquified fuel 30 for its vaporization. Ideally, the temperature of coolant 108 should range from approximately 160 degrees fahrenheit (71 degrees Celsius) to about 180 degrees fahrenheit (82 degrees Celsius). This can easily be accomplished by using a proper temperature rated liquid thermostatic valve 114 to regulate the flow of coolant 108.

Still another method of fuel heating would be to use the hot exhaust emissions from the engine (not illustrated) and to direct these gases so that they may be used in a heat exchanger and thus, furnish the heat required to the component needing it. Electric heating elements can also be used where electricity is available. One or more large metal heat sinks extending from the component to the surrounding air will also provide additional heat if the air itself is warmer than the component requiring the heat. Other methods of heating are, of course, possible.

This last mentioned method of heating operates on a very simple premise. As heat is absorbed by the LPG fuel 30 during its evaporation within the fuel tanks 22 or 50, vaporizer 96, or regulator 42, it will in general, make that component cooler. Therefore, as long as these parts remain cooler than the surrounding air it will result in heat migrating from the surrounding air through the heat sink and into these cooler parts. Furthermore, the larger the surface area of the heat sink in relation to the surrounding air the greater the amount of heat transferred to these parts. If the heat sink or components used are also coloured black it will further help accelerate the amount of heat absorb.

Some of these fuel heating methods are also explained by Lent and Nelson in U.S. Pat. No. 4,528,966 which issued 16 Jul. 1985. U.S. Pat. No. 4,528,966, the disclosure of which is hereby incorporated by reference into this specification, further details some of the heating methods available.

The disclosure, thus far, has used a chokeless carburation type device as the fuel-air mixer 46. Mixer 46, of which there can be more than one used upon an engine, is used to correctly mix both fuel and air in their proper ratios for optimal fuel combustion. This device provides an inexpensive, reliable and quite efficient method for achieving proper fuel combustion. However, a more efficient device, called a fuel injection system (not shown), can be used, as a fuel-air mixer 46, to inject fuel, as a vapour or as a liquid, into an internal combustion engine 48.

Fuel injection systems provide, whether gaseous or liquid, a more exact metering of fuel into the air stream. Thus, air displacement by the fuel is not as great as that found in carburation type fuel-air mixers. This results in a better fuel burn. Fuel injection systems are also more responsive to throttle control and therefore, provide quicker power response.

There are two basic types of fuel injection systems the first of which is called throttle body or single-point injection. With this technique fuel is injected into a stream of incoming air before it is distributed to each cylinder. Multipoint injection, the second method, functions by directly injecting fuel into each cylinder. This technique is more efficient, where multi cylinder engines are used, but it is the more costlier method. However, it must be noted that this disclosure deals with small internal combustion engines, the bulk of which, consist of one cylinder. Consequently, single-point and multipoint could be considered, by default, one in the same thing. That is, their individual performance ratings would yield minimal differences when dealing with one cylinder engines.

Presently, both types of fuel injection systems are generally electrically controlled, however, mechanically functioning types have been developed in the past. Mechanical fuel injection is very expensive and, consequently, cost renders this method generally impractical. As a result, present day engines must have some kind of electrical system such as a battery and charging unit or equivalent device in order to supply the fuel injectors with the electrical energy that they need to operate.

Therefore, the criteria used in determining which system to use is basic. In small engines, where battery or similar power is not available, it is preferable to use a carburation type of fuel-air mixer. Where electric power is available, and the expense can be justified, fuel injection provides an improved performance over carburation.

Regardless of the fuel system or components used, once the LPG fuel has been vaporized it should be kept as cool as possible. This is to prevent the fuel, when in gaseous form, from overheating. These gases when heated expand in volume which results in a lower energy density than is desirable. Consequently, it is preferable to keep petroleum gas fuels as cool as possible, at as constant a temperature as practical, and to use component heating only when needed.

Another aspect of this invention is that some of the components may be combinable. For example, a fuel filter may be combined with a manual close-off valve or a fuelling receptor. A regulator with a fuel lock. A fuel lock with a filter or a regulator with a fuel-air mixer. Combinations of three, four, and even more components are very possible. Components can even be placed in a specific position within another component. An example would be to place a fuel filter 64 within the probe 34. This would reduce the overall physical size of fuel system 20 while simultaneously providing a cleaner fuel system as the fuel 30 is filtered much earlier than before. It should also be noted that all these combinations can be designed so that they may be dismantled and, thus, facilitate the changing of a worn out component.

It must also be realized that it is possible to combine all of the fuel supply system 20 components into one large unit. With this design the fuel conduits are greatly minimized but are not eliminated. The reason for this is that the individual component housings, when connected together, act and perform as a fuel conduit in channelling the fuel from one component to another. Therefore, as demonstrated, the fuel conduits can be reduced to a total of one but they are not eliminated entirely.

These combinations and others can, therefore, offer reduced manufacturing costs, reduced material usage, a more compact fuel system and increased reliability. Whatever the system used the basic functioning and operation will remain substantially the same whether they are combined or not.

As some components can be combined their sequence or positioning in a fuel system may also vary. The disclosed sequences and positioning of components offers but one avenue of operation. Other arrangements are of course possible, but as before, the basic functioning and operation and therefore the outcome will remain substantially the same whether they are repositioned or not.

Further literature and information on the subject of LPG fuel systems, engines, and vehicles can be found in the many books available to the public at libraries, technical centres, repair shops, and government publications. Furthermore, some of these sources can provide technical, pricing, and availability information on each system component used in these machines.

In conclusion, therefore, the preceding description contains many specificities that should not be construed as limiting the scope of the invention but as merely providing illustrations of some of the presently preferred embodiments of this invention and thus, the scope of the invention should be determined by the appended claims and their legal equivalents, rather than by the examples given.

The embodiments of the invention in which an exclusive property or privilege is claimed are defined as follows:

1. A fuel supply system means, for use in an internal combustion spark ignition engine, connected to at least one fuel tank means wherein said fuel tank means further comprises a primary pressure relief valve means, and a fuel shut-off valve means, and is further provided with a liquified propane base fuel having a gaseous head, and which, when connected in gaseous flow communication to said fuel supply system means, serves as the fuel tank means, and a fuel vaporizer means for said internal combustion engine, and wherein said fuel supply system means operates on a gaseous propane based fuel, and further comprises, in combination, a fuelling receptor means wherein said fuelling receptor means when connected to said fuel tank means is in gaseous flow communication with said gaseous head of said fuel tank means, a fuel lock means, a pressure regulator means, and a fuel-air mixer means connected together, in series and in gaseous flow communication, by at least one fuel conduit means.

2. The claim as recited in claim 1 further including a heating means that serves to transfer heat energy from a heat energy source to at least one component, said component being selected from the group consisting of fuel supply system means and fuel tank means.

3. The claim as recited in claim 2 further including a fuel filter means which serves to remove impurities from the propane based fuel, and the fuel supply system means.

4. The claim as recited in claim 3 wherein said fuel supply system means further includes a secondary pressure relief valve means in gaseous flow communication with the fuelling receptor means and fuel lock means.

5. The claim as recited in claim 3 wherein the fuel supply system means further includes at least one component selected from the group consisting of a manual close-off valve means, a check valve means, a secondary pressure relief valve means, an excess flow valve means, an adaptor means, and a fuel contents gauge means.

6. The claim as recited in claim 1 further including a fuel filter means which serves to remove impurities from the propane based fuel, and fuel supply system means.

7. The claim as recited in claim 6 wherein said fuel supply system means further includes a secondary pressure relief valve means in gaseous flow communication with the fuelling receptor means and fuel lock means.

8. The claim as recited in claim 7 wherein the fuel supply system means further includes at least one component selected from the group consisting of a manual close-off valve means, a check valve means, an excess flow valve means, an adaptor means, and a fuel contents gauge means.

9. The claim as recited in claim 1 wherein said fuel supply system means further includes a secondary pressure relief valve means in gaseous flow communication with the fuelling receptor means and fuel lock means.

10. The claim as recited in claim 1 wherein the fuel supply system means further includes at least one component selected from the group consisting of a manual close-off valve means, a check valve means, a secondary pressure relief valve means, an excess flow valve means, an adaptor means, and a fuel contents gauge means.

11. The claim as recited in claim 1 further including a fuel conduit extension means that serves to connect, in gaseous flow communication, the gaseous head of said fuel tank means to the fuelling receptor means of said fuel supply system means.

12. The fuel conduit extension means of claim 11 further including a quick disconnect coupling means.

13. The claim as recited in claim 1 further including a multi-hookup fuel conduit means that serves to connect, in gaseous flow communication, the gaseous head of at least one fuel tank means to the fuelling receptor means of said fuel supply system means.

14. A fuel supply system means, for use in internal combustion spark ignition engines, connected to a fuel tank means wherein said fuel tank means is provided with a propane based fuel having a gaseous and a liquid portion, and capable of both gaseous and liquid withdrawal of said propane base fuel from said fuel tank means, and wherein said fuel tank means further comprises a primary pressure relief valve means and a fuel shut-off valve means, and wherein said fuel supply means is operable on both gaseous and liquid propane based fuel up to and including the pressure regulator means and thereafter operable solely on gaseous propane based fuel and which further comprises in combination, a fuelling receptor means wherein said fuelling receptor means is in fuel flow communication with said propane based fuel when connected to said fuel tank means, a fuel lock means, a fuel vaporizer means which serves to vaporize the liquified propane based fuel located within the fuel supply system means, a primary pressure regulator means, and a fuel-air mixer means, connected together, in series and in fuel flow communication, by at least one fuel conduit means.

15. The fuel supply system means of claim 14 further including a heating means that serves to transfer heat energy from a heat energy source to the fuel supply system means in order to aid in fuel vaporization.

16. The claim as recited in claim 15 further including a fuel filter means which serves to remove impurities from the propane based fuel, and fuel supply system means.

17. The claim as recited in claim 16 wherein the fuel supply system means further includes at least one component selected from the group consisting of a manual close-off valve means, a check valve means, a secondary pressure relief valve means, an excess flow valve means, an adaptor means, and a fuel contents gauge means.

18. The claim as recited in claim 14 further including a fuel filter means which serves to remove impurities from the propane based fuel, and fuel supply system means.

19. The claim as recited in claim 18 wherein the fuel supply system means further includes at least one component selected from the group consisting of a manual close-off valve means, a check valve means, a secondary pressure relief valve means, an excess flow valve means, an adaptor means, and a fuel contents gauge means.

20. The claim as recited in claim 14 wherein the fuel supply system means further includes at least one component selected from the group consisting of a manual close-off valve means, a check valve means, a secondary pressure relief valve means, an excess flow valve means, an adaptor means, and a fuel contents gauge means.

* * * * *